Sept. 19, 1967   D. L. MILLER   3,341,973
SCREEN ROLLER ASSEMBLY
Filed July 19, 1965   2 Sheets-Sheet 1
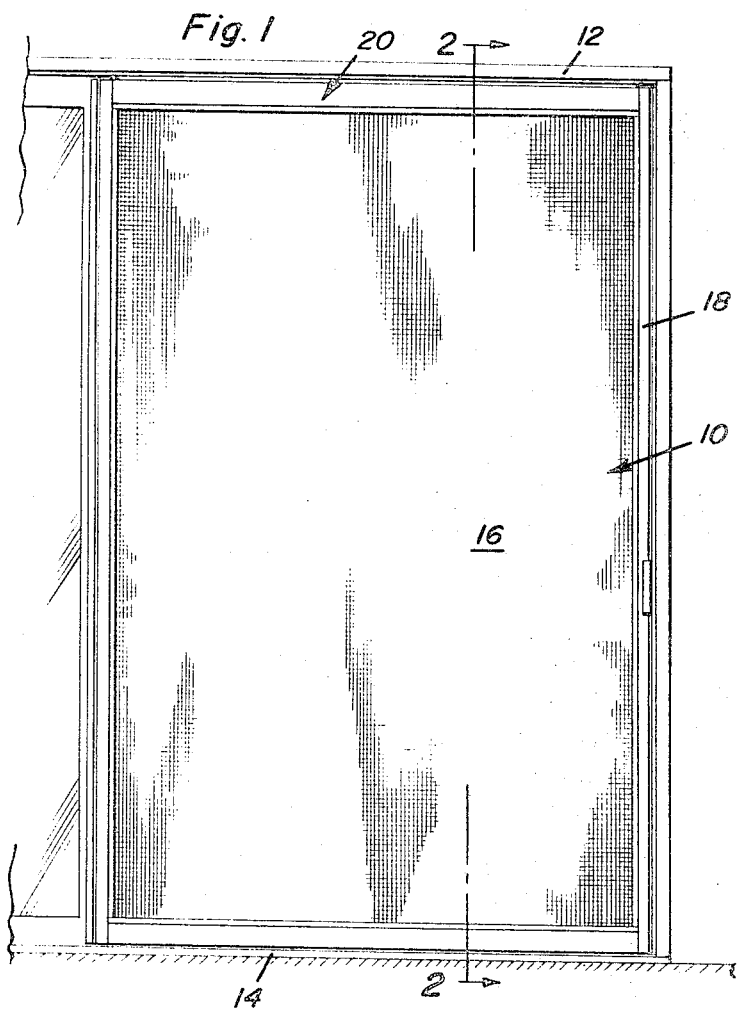
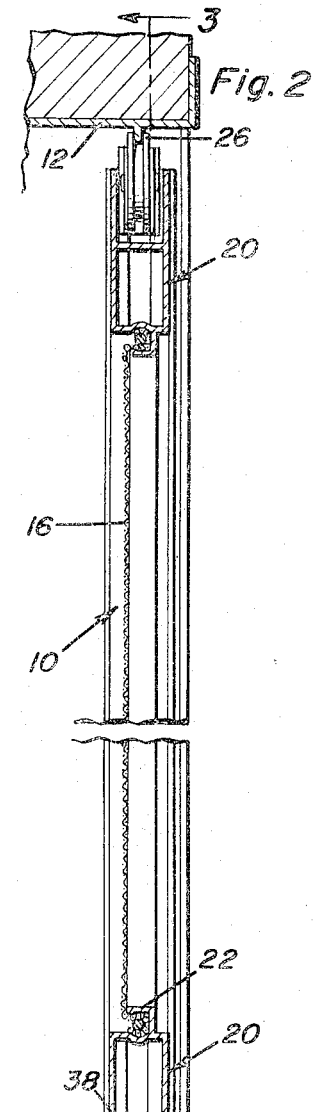
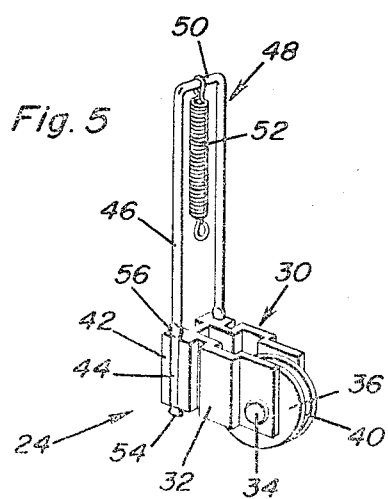
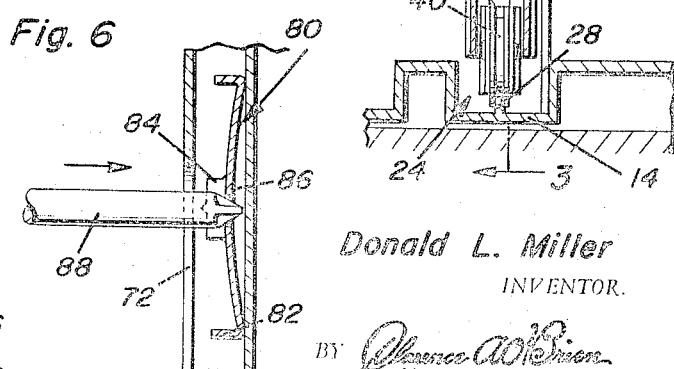
Donald L. Miller
INVENTOR.

Sept. 19, 1967     D. L. MILLER     3,341,973
SCREEN ROLLER ASSEMBLY
Filed July 19, 1965     2 Sheets-Sheet 2
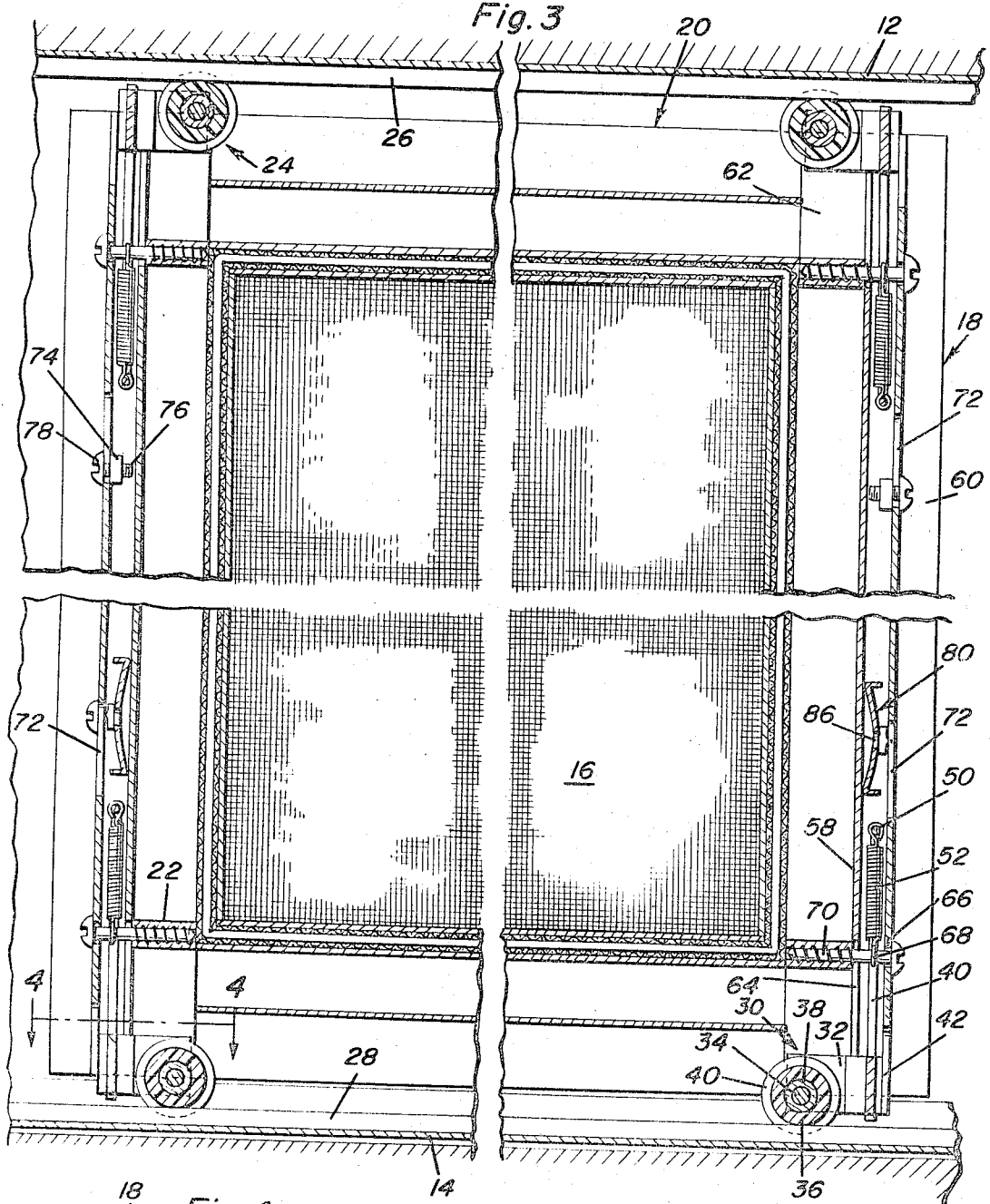
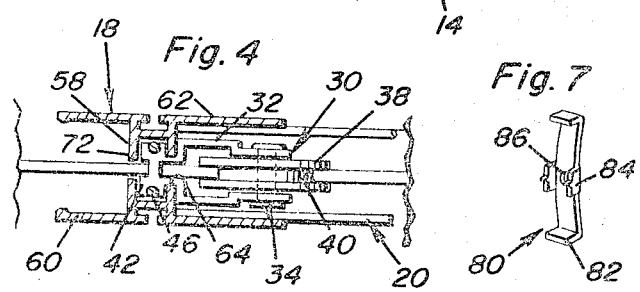
Donald L. Miller
INVENTOR.

United States Patent Office 3,341,973
Patented Sept. 19, 1967

3,341,973
SCREEN ROLLER ASSEMBLY
Donald L. Miller, Miami, Fla., assignor to Daryl Industries, Inc., a corporation of Florida
Filed July 19, 1965, Ser. No. 472,782
2 Claims. (Cl. 49—420)

ABSTRACT OF THE DISCLOSURE

The slidable mounting of a screen panel between upper and lower tracks by roller assemblies projecting from the panel frame adjacent its corners. Each roller assembly is urged outwardly into engagement with the tracks by a spring connected to the roller assembly, the inward movement of which is limited by an adjustable stop mounted in the panel frame.

---

This invention relates to track mounted panel assemblies such as screen panels and more particularly to the track engaging roller guides associated with such panel assemblies.

A primary object of the present invention is to provide a vertical panel assembly adapted to be slidably mounted between upper and lower tracks within an opening by means of track engaging rollers arranged to support the panel and guide movement thereof in an effortless and trouble-free manner.

A further object of the present invention is to provide roller guide facilities for vertical panels, doors or screens formed from extruded aluminum frame members, the roller guide facilities being mounted within the vertical frame members or stiles and projecting from the upper and lower ends of such stiles for engagement with upper and lower track members associated with the opening within which the panel is mounted.

A still further object of the present invention is to provide roller guide assemblies associated with the panel framing of a panel assembly for yieldable displacement into the vertical stiles associated with the panel so as to accommodate irregularities in the track members between which the panel is supported without interfering with the guided movement of the panel along the track members.

Summarizing the present invention, a track mounted panel frame is provided with roller guide assemblies, each assembly having a bracket which mounts the track engaging roller and a spring mounting element engageable with an adjustably positioned stop element to limit retraction of the roller guide assembly into the vertical stile associated with the panel frame against the bias of a spring element, the spring element also being operative to limit outward movement of the guide assembly to prevent disassembly thereof from the panel. After installation the stop elements may be adjustably positioned to prevent disassembly of the panel from the track members between which it is guidingly mounted.

Another object of the present invention in accordance with the foregoing objects, is to provide a roller guide assembly for panels which is easily installed within its associated panel and facilitates proper mounting of the panel between the track members which establishes its path of movement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of a track mounted panel assembly constructed in accordance with the present invention;

FIGURE 2 is an enlarged partial sectional view taken substantially through a plane indicated by the section line 2—2 of FIGURE 1;

FIGURE 3 is a sectional view taken substantially through a plane indicated by section line 3—3 in FIGURE 2;

FIGURE 4 is a partial sectional view taken substantially through a plane indicated by section line 4—4 in FIGURE 3;

FIGURE 5 is a perspective view of the track engaging roller guide assembly associated with the present invention;

FIGURE 6 is an enlarged partial sectional view through a portion of the panel assembly showing the manner in which one of the stop elements is repositioned; and FIGURE 7 is a perspective view of one of the stop elements associated with the panel assembly.

Referring now to the drawings in detail, it will be observed from FIGURE 1 that the present invention is shown associated with a screen type of panel assembly generally referred to by reference numeral 10 adapted to be slidably mounted for movement along a path prescribed by an upper track member 12 and a lower or floor mounted track member 14. In the illustrated embodiment, the panel assembly 10 includes screening 16 supported by panel framing which includes a pair of vertical stiles 18 interconnected by upper and lower rails 20. The rails and stiles are preferably made of extruded aluminum having splined groove formations 22 within which the edges of the screening 16 are anchored as shown in FIGURES 2 and 3. Mounted by the stiles 18 at each of the four corners of the panel assembly 10, are track engaging guide assemblies generally referred to by reference numeral 24 each of the guide assemblies being engageable with the guide fins 26 and 28 which respectively project from the upper and lower track members 12 and 14.

As more clearly seen in FIGURE 5, each of the track engaging guide assemblies 24 includes a bracket member 30 having interconnected side sections 32 through which a riveted axle 34 extends for rotatably mounting a track engaging roller 36 on an oil impregnated, sintered bronze bushing 38 for example as shown in FIGURE 3. The rollers 36 are provided with annular grooves 40 within which the track fins 26 and 28 are received. Accordingly, the track engaging assemblies 24 are slidably mounted by the stiles 18 and project from opposite ends thereof. The side sections 32 of the roller bracket 30 are interconnected at a slide portion 42 engageable by the stile for guiding vertical movement of the bracket member therewithin. The slide portion 42 on each of the side sections 32 are also provided with grooves 44 within which the vertically elongated legs 46 of a spring mounting element 48 are received. The upper ends of the legs 46 are interconnected by a spring anchoring portion 50 so as to form a loop to which one end of a spring element 52 is connected. The legs are secured against vertical displacement within the grooves 42 by means of staking at locations 54 and 56 as more clearly seen in FIGURE 5.

Referring now to FIGURES 3 and 4, it will be observed that each of the stiles 18 includes an intermediate guide portion 58 within which the slide portions 42 of the bracket members 30 are slidably received adjacent the opposite ends of the stiles and through which the spring mounting elements 48 extend. The guide portion of the stile is concealed between the outer portion 60 and the inner portion 62 of the stile formed integrally therewith in cross section as more clearly seen in FIGURE 4 so that the stile may be fabricated by an extrusion method. The ends of the rails 20 are received between the sides of the inner framing portion 62 of the stiles in abutting relation to the guide portions 58 thereof. The guide portions 58 are therefore slotted at 64 so that the bracket members 30 may project through the slot between the side portions of the rails. An aperture 66 is also formed in the vertical guide portion 58 aligned with both the anchored end 68 of the spring element 52 and the spline groove 22 of the rail. A metal screw member 70 may thereby be inserted through the aperture 66 and the anchored end 68 of the spring element for threaded reception within the spline groove as shown in FIGURE 3 serving to anchor one end of the spring element to the panel frame as well as to secure the vertical stiles to the horizontal rails. The spring anchoring screw member 70 is also straddled by the spring mounting element 48 and spaced between the section 50 thereof and the bracket member 30 so that the springs 52 will both yieldably resist inward retraction of the roller guide assembly 24 into the stile as well as to limit outward projection thereof from the opposite ends of the stiles thereby preventing disassembly of the roller guide assemblies from the stiles.

It will be appreciated that when the panel assembly 10 is mounted between the upper and lower track members, the roller guide assemblies 24 will be displaced against the bias of the spring elements 52 inasmuch as the rollers 36 will be retracted by a sufficient amount to engage the guiding fins 26 and 28 with a certain amount of spring pressure. Thus, the roller guide assemblies may be displaced both inwardly and outwardly from the opposite ends of the stiles as they encounter irregularities in the track members between which the panel assembly is mounted. The vertical spacing between the spring anchoring screw members 70 will therefore be such as to cause the spring element 52 to exert a minimum spring force at the location of maximum vertical spacing between the track members 26 and 28 or for the largest vertical openings within which the panel assembly is adapted to be mounted.

Depending upon the particular installation in which the panel assembly is mounted, inward displacement of the roller guide assemblies 24 against the bias of the spring elements 52 must also be limited in order to prevent unintentional disengagement of the panel assembly from its track mounting and to align the panel with the surrounding framework. Toward this end, the guide portions of the vertical stiles are provided with adjustment slots 72 spaced from the upper and lower ends thereof as more clearly seen in FIGURE 3. Exposed through the adjustment slots 72 are stop elements adjustably positioned to limit inward displacement of the roller guide assemblies by abutment with the spring anchoring sections 50 of the spring mounting elements 48. One type of stop element as shown in the upper portion of FIGURE 3 includes a square nut member 74 non-rotatably received within the guide portion 58 of the stile and threadedly receiving therethrough a screw member 76 which extends through the adjustment slot 72. Accordingly, the nut member 74 may be held in an adjusted position along the slot 72 by clamping of the guide portion between the nut member and the head portion 78 of the screw member. A tool applied to the head portion 78 may therefore loosen the nut member so that it may be slidably positioned along the adjustment slot 72 and then retightened.

Referring now to the lower portion of FIGURE 3 and to FIGURES 6 and 7, another type of stop element 80 is shown in the form of a spring strip one of the folded ends 82 being adapted to abut the spring mounting element 48 in order to limit retraction of the roller guide assembly into the guide portion 58 of the stile. The stop element 80 is held in an adjusted position between the vertical sides of the guide portion by means of a toothed lock portion 84 which straddles the adjustment slot 72 so as to engage the guide portion. Accordingly, the stop element 80 is bowed between the ends 82 so that the lock portion 84 in the unstressed state will bite into the metal of the guide portion on that vertical side thereof opposite the side engaged by the ends 82 in order to hold the stop element in its adjusted position. Disposed intermediate the ends of the stop element is a tool engaging aperture 86 which is exposed through the adjustment slot 72 so that a tool such as the end of a Phillips head screwdriver 88 as shown in FIGURE 6 may be inserted through the adjustment slot into the aperture 86. In this manner, the stop element may be deformed to the position shown in FIGURE 6 releasing the lock portion 84 from engagement with the guide portion. The stop element may then be repositioned by means of the tool 88 by slidable displacement of the tool along the guide slot 72. Upon removal of the tool 88, the stop element will once again be locked in its readjusted position by means of the lock portion 84.

From the foregoing description, the construction, operation and utility of the track guided panel assembly of the present invention will be apparent. It will therefore be appreciated that the roller guide assemblies 24 may be readily assembled within the panel assembly by slidable insertion thereinto at opposite ends of the stiles. When the anchor ends 68 of the spring elements 52 are aligned with the apertures 66 in the stile guide portions 58, the anchoring screw members 70 may be inserted therethrough. The roller guide assemblies will then be held in assembled positions within the panel and displaced inwardly against the bias of the spring elements 52 in order to install the panel between the upper and lower track members. The panel may then be moved along the track members between its limit positions to determine the maximum amount by which the roller guide assemblies 24 are retracted in order to properly adjust the positions of the releasable stop elements 74 or 80 installed within the guide portions 58 of the stiles prior to insertion of the roller guide assemblies 24. Thus, the panel assembly when constructed in accordance with the present invention may be easily installed and adjusted for different installations and also results in a trouble free installation from which a panel may be easily removed, repaired and roller guides replaced.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. In combination with a pair of vertically spaced tracks for guiding movement of a panel frame having a vertical stile and a pair of rails connected to opposite ends of the stile, a guide assembly mounted by the stile comprising track engaging means slidably mounted by the stile projecting from said opposite ends thereof, a spring element connected to each of said track engaging means within the stile, spring anchoring means connecting each of said spring elements to the stile at locations for limiting outward projection of the track engaging means from the stile and yieldably resisting inward retraction thereof, and adjustable means mounted by the stile for limiting said inward retraction of the track engaging means to prevent disassembly of the panel frame from the tracks, said adjustable means including a releasable stop element mounted within said stile adjacent one end of each of the spring elements remote from an opposite end to which the anchoring means is connected, said stile having slots formed therein through which the stop elements are exposed, and a lock portion connected to the stop element in straddling relation to the slot engaging the stile to hold the stop element in adjusted position, said stop element having a tool receiving formation thereon exposed through the slot whereby deformation of the stop element by insertion of a tool through the slot will disengage the lock portion and permit repositioning of the stop element along the slot.

2. In combination with a pair of vertically spaced tracks for guiding movement of a panel frame having a vertical stile and a pair of rails connected to opposite ends of the stile, a guide assembly mounted by the stile comprising track engaging means slidably mounted by the stile projecting from said opposite ends thereof, a spring element connected to each of said track engaging means within the stile, spring anchoring means connecting each of said spring elements to the stile at locations for limiting outward projection of the track engaging means from the stile and yieldably resisting inward retraction thereof, and adjustable means mounted by the stile for limiting said inward retraction of the track engaging means to prevent disassembly of the panel frame from the tracks, each of said track engaging means comprising a bracket having a slide portion slidably mounted by the stile, a spring mounting element connected to the slide portion and extending into the stile in straddling relation to the spring anchoring means, said spring element being connected to the mounting element spaced from one side of the anchoring means opposite the bracket, and a track engaging roller mounted by the bracket projecting from one of said ends of the stile.

References Cited

UNITED STATES PATENTS

| | | | |
|---|---|---|---|
| 1,100,598 | 6/1914 | McLaren et al. | 160—287 |
| 3,010,084 | 5/1963 | Banner | 49—420 |
| 3,108,547 | 10/1963 | Shaver | 49—420 X |
| 3,281,993 | 11/1966 | Riegelman | 16—105 X |
| 3,284,953 | 11/1966 | Rifkin | 49—420 |
| 3,298,136 | 1/1967 | Saunders | 49—425 |

DAVID J. WILLIAMOWSKY, *Primary Examiner.*

P. C. KANNAN, *Assistant Examiner.*